Oct. 12, 1926.  1,602,705
N. C. RILEY ET AL
GASOLINE PURIFIER
Filed April 4, 1925
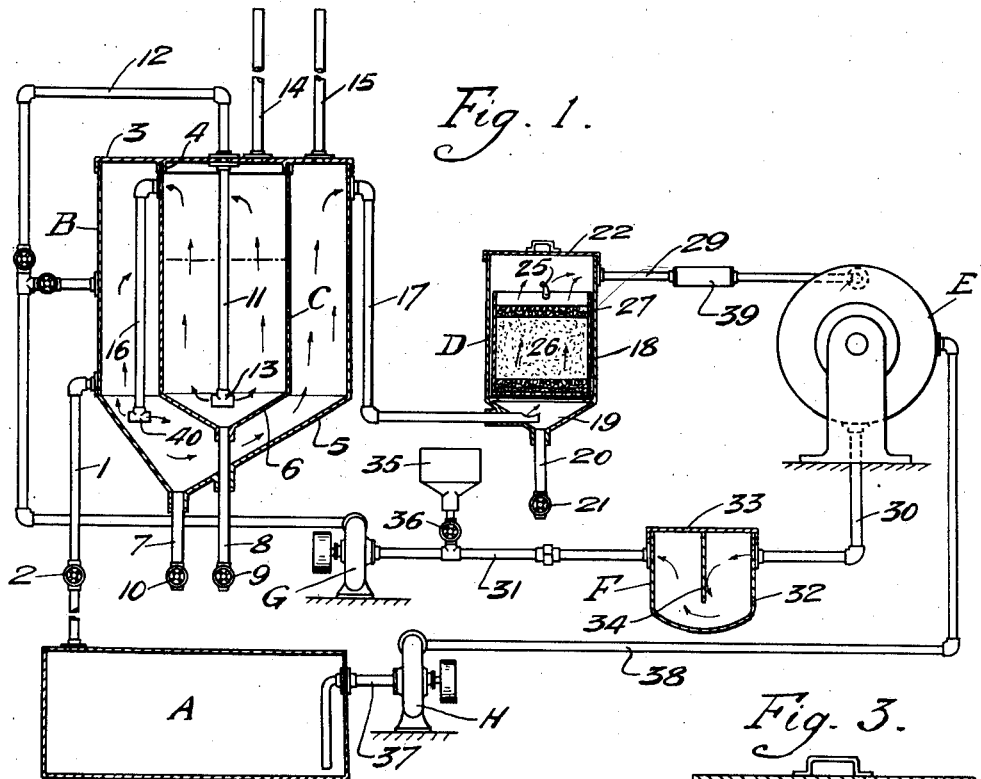
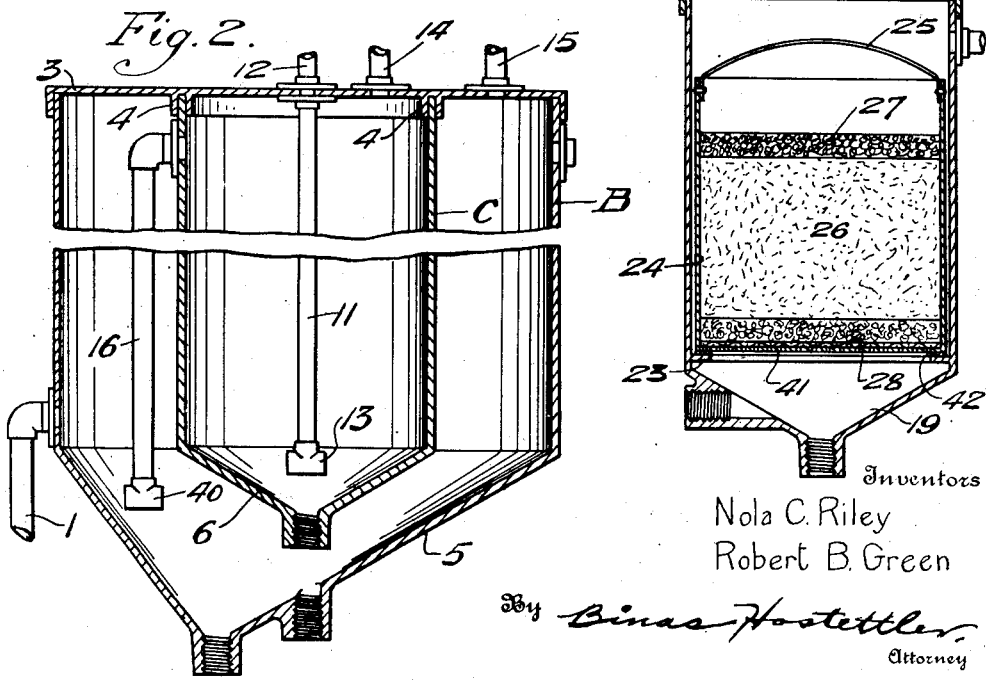
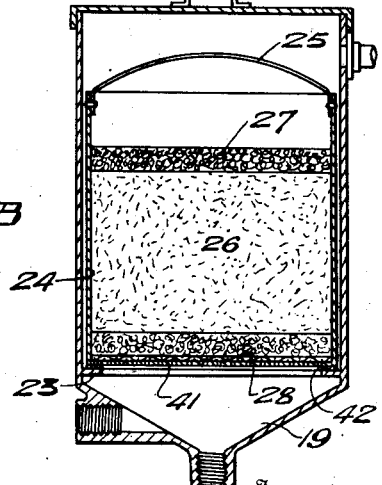
Inventors
Nola C. Riley
Robert B. Green
By Binas Hostettler
Attorney Patented Oct. 12, 1926.

1,602,705

UNITED STATES PATENT OFFICE.

NOLA C. RILEY AND ROBERT B. GREEN, OF HOLDENVILLE, OKLAHOMA.

GASOLINE PURIFIER.

Application filed April 4, 1925. Serial No. 20,824.

The present invention relates to a gasoline purifying system comprising a washer, a plurality of tanks, a filter and a means for causing a circulation of the gasoline through these elements. The elements are so arranged that there may be a continuous flow of the dirty gasoline from the washer through the tanks and filter and its immediate return to the washer in a purified state without requiring the gasoline to stand for a certain period for the purpose of settling.

The tanks are so arranged and constructed that the gasoline can be discharged into the bottom of the inner tank into the form of a spray. In this inner tank it may further be treated with caustic soda and water. Much of the sediment contained and carried by the gasoline will be deposited and precipitated to the bottom of the tanks before it is conducted to the filter.

A feature of the present device is that it can be made much more compact than those now on the market and is capable of operation with a much less capacity of gasoline. Ordinarily it is necessary to allow the gasoline to stand for some length of time after it has passed through the filtering apparatus in order that any remaining sediment may settle. However, the present system is so constructed and the elements so arranged that all foreign matter and sediment will be removed from the gasoline when it has passed through the purifying device.

Specifically the objects of our invention are to provide a multiple tank decanter into which the gasoline is admitted, treated with caustic soda or the like and conveyed through the system in such a manner that all the sediment will be entirely removed; to provide a filter that is cheaply constructed, efficient in operation and readily capable of being removed from the container; to provide a filter located between the tanks and the washer in order to conduct the gasoline from the bottom to the top of the filter container; and to provide such a system whereby the gasoline is continuously and quickly purified, rendering it immediately available for re-use in the washer as soon as it has passed through the tanks and filter.

The invention comprehends the provision of a simple, efficient construction and arrangement of parts and other features of novelty hereinafter more fully described, reference being had to the accompanying drawing which forms a part of this application and in which:—

Figure 1 is a plan view of the entire system and arrangement of elements with some of the associated members shown in cross section.

Figure 2 is an enlarged view of the multiple tank decanter shown in cross section.

Figure 3 is an enlarged view of the filtering member shown in cross section.

Referring now to the drawing, the purifying system is comprised of the supply tank A, the tanks B and C, the filtering receptacle D, the washer E, the trap F, and the pump G. These members are preferably so arranged that the filtering receptacle will be located between the tanks and the washer.

A sufficient supply of gasoline to operate the system will be admitted into the line through the pipe 1 by manipulation of the valve 2 located within the pipe. This pipe is shown connected to the outer tank B, but may be fitted into the line at some other point, such as to the washer E through pipes 37 and 38 hereinafter to be described.

The outer tank B is provided with a removable cover 3 which is supplied with an annular peripheral flange to engage and envelop the top edge of the tank wall when the cover is in place. The cover can be attached to the tank by any well known means. Another flange or flanges 4, also annular, protrude from the under side of the cover to receive one end of the inner tank C and support it suspended within the outer container. The end of the inner container can also be removably fixed to the inner flange 4 by any well known means.

Both the outer and inner tanks are preferably constructed with inclined bottoms 5 and 6 respectively, and the lowest portions of the inclined bottoms are recessed to receive the draining pipes 7 and 8. Into these draining pipes are located the manually operative valves 9 and 10 in order to draw the sediment from the bottom of the tanks.

Leading into the inner tank through the cover is the pipe 11, a continuation of the line 12 from the pump. The pipe 11 preferably extends vertically and axially into the tank and terminates near the inclined tank bottom into a T coupling 13. As the gasoline is discharged into this inner tank from the line through the T, it will be broken up into a spray and thus more readily deposit any sediment into the bottom of the tank. The cover is further provided with two ports opening into the tubes 14 and 15 which provide air ports for the inner and outer tanks respectively.

There is depending from one side of the inner tank the tube 16 which provides a communication between the top of the inner tank and the bottom of the outer tank. A T coupling 40 is also fitted on the end of this tube similar to 13. It is, of course, obvious that this tube member 16 could be placed on any portion of the exterior wall of the inner tank or it would be possible to eliminate this member and merely have a port through the wall of the inner tank. However, it is preferable to have the gasoline from the inner tank conducted to or near the bottom of the outer tank.

From the top of the outer tank, there is connected the conduit pipe 17 leading from this tank to the bottom of the filter containing tank 18. This filter tank too is preferably formed with an inclined bottom 19 and a drain pipe 20 depending therefrom. The filter tank is inclosed by the removable cover plate 22 which is fitted on top of the tank. It is observed that the filter tank is practically identical in configuration with the two purifying tanks above described. An additional feature, however, is the interiorly extended flange 23 which supports the removable filter receptacle 24. This filter receptacle is constructed in much the form of a bucket and is provided with a handle 25 making it feasible and convenient to insert and remove from the container when the cover is displaced.

There is contained within the receptacle a supply of fuller's earth, or very fine white sand 26, contained between a top and bottom layer of cotton and fine wire screening designated by numerals 27 and 28 respectively. The edges of the wire screenings will engage the interior surface of the filter receptacle and secure them and the fuller's earth in position. The filter receptacle is formed with the perforated bottom 41 which can be integrally or otherwise connected therewith. The inwardly extending flange on the container is of sufficient width so that when the receptacle is in place within the container it will extend beneath the bottom to support and prevent any possibility of the filtering material and screening dropping out of the receptacle.

The conduit 29 leads from the top of the container to the washer E above mentioned. The washer is merely an element of the system and any conventional type thereof may be used.

The dirty gasoline will be removed from the washer E through the conduit pipe 30 and will pass through the trap F before it is admitted into conduit 31 leading back to the inner purifying tank. The circulation of the gasoline through the various elements of the system is obtained by means of a pump G of any type desired.

The trap is not essential to the operation of the system but it is preferable inasmuch as it will at once catch and retain any sediment such as buttons from the dirty gasoline as soon as it leaves the washer and prevent it from entering other parts of the system where it could interfere with its operation. The trap comprises a casing 32 and a detachable cover 33 secured thereto by any suitable means. Depending from the cover and extending into the casing below the inlet opening of the pipe 30 is the wall or baffle plate 34. The exact location of this plate within the trap is not material and it can be placed anywhere intermediate the inlet and outlet ports.

Numeral 35 designates a charging hopper or funnel coupled into the line at any point in the system and may be opened and closed by means of a valve 36. This member is auxiliary to the supply tank and affords another means for supplying the necessary amount of gasoline into the system for operation. As above stated, this is an auxiliary supplying means through which gasoline is admitted from any source and its not necessary unless the supply tank A is eliminated.

No means has been shown for supporting the purifying tank for the reason that these are more often located underground in order to meet the requirement of city ordinances. However, the system is constructed the same whether it be located above or below the ground surface. If it be located above, any ordinary supporting means or foundation can be used.

It will be readily understood of course that ordinarily the gasoline from the supply tank will already be in a purified state and, if such be the case, it can be directly delivered to the washer from the supply tank rather than to the purifying tanks as would otherwise be preferred. Then again, it is sometimes desired to have a motor pump for forcing the gasoline into the washer. Therefore, we have shown the pump H connected to the supply tank A by means of the pipe line 37 and to the washer by the pipe line 38.

The glass 39 is fitted into the line 29 between the filtering tank and the washer so that the operator may readily observe the nature of the gasoline flowing into the washer. It is obvious that a like means can be inserted in any other place in the system to observe the condition of the gasoline.

The operation of the device will be obvious from the above description. The necessary amount of gasoline will be admitted to the system from the supply tank such as A through the line 1 by opening the valve 20. The pump G will then be started to cause the circulation of the dirty gasoline from the washer E through the pipe 30 into the trap 32. From here it will continue through the line 31 and 12 and be sprayed into the inner tank member C through the T fitting 13. Because of this spraying there will be a tendency for all sediment and foreign matter to be precipitated to the bottom of this tank. This tank may also contain caustic soda and water which will further aid the separation of any foreign material from the gasoline. As the inner tank is filled the gasoline will overflow through the pipe 16 and thence be conducted to the bottom of the outer tank through the T at the end of the pipe. Again there will be a tendency for any remaining sediment that may have been carried from the inner tank to be precipitated to the bottom of the outer tank. The gasoline from here overflows from the outer tank to the conduit 17 leading into the bottom of the filter container 18 and continues to the top of the filtering container through the filtering material 26, 27 and 28 and back to the washer in a purified condition.

Having described our invention and explained its method of operation it is obvious that various changes may be made without departing from its essential features and it is our intention to cover all modified forms and use of equivalents which may reasonably be included within its scope.

We claim as our invention:—

In a decanter, a plurality of tanks, one within the other, and each having inclined bottoms, a common removable closure for said tanks, said closure being supported by the outer tank and solely supporting the interior tank, drain conduits attached to the inclined bottoms of each tank, an inlet for the inner tank terminating adjacent to the outlet conduit of the inner tank, a conduit extending from the upper portion of the inner tank to a point adjacent the outlet conduit of the outer tank.

In testimony whereof we affix our signatures.

NOLA C. RILEY.
ROBERT B. GREEN.